United States Patent
Harris

(10) Patent No.: US 6,304,854 B1
(45) Date of Patent: Oct. 16, 2001

(54) SYSTEM AND METHOD FOR PROVIDING A COMPARABLE BRANDED PRODUCT BASED ON A CURRENT BRANDED PRODUCT FOR NON-COMPARISON SHOPPED PRODUCTS

(75) Inventor: Michael T. Harris, Demarest, NJ (US)

(73) Assignee: Dunhill Holdings, Corp., New York, NY (US)

(*) Notice: Subject to any disclaimer, the term of this patent is extended or adjusted under 35 U.S.C. 154(b) by 0 days.

(21) Appl. No.: 09/393,228

(22) Filed: Sep. 9, 1999

(51) Int. Cl.[7] .................................................. G06F 17/60
(52) U.S. Cl. ................................................. 705/27; 705/26
(58) Field of Search ........................... 705/26, 27; 707/3, 707/5, 6

(56) References Cited

U.S. PATENT DOCUMENTS

| | | |
|---|---|---|
| 1,927,702 | 9/1933 | Foss . |
| 3,581,072 | 5/1971 | Nymeyer . |
| 3,637,989 | 1/1972 | Howard et al. . |
| 3,688,087 | 8/1972 | Howard et al. . |
| 4,034,839 | 7/1977 | Lee . |
| 4,446,528 | 5/1984 | Marmon . |
| 4,486,853 | 12/1984 | Parsons . |
| 4,500,880 | 2/1985 | Gomersall et al. . |
| 4,528,638 | 7/1985 | Hatta et al. . |
| 4,567,359 | 1/1986 | Lockwood . |
| 4,799,156 | 1/1989 | Shavit et al. . |
| 4,942,616 | 7/1990 | Linstroth et al. . |
| 4,992,940 | 2/1991 | Dworkin . |
| 4,994,964 | 2/1991 | Wolfberg et al. . |
| 5,063,506 | 11/1991 | Brockwell et al. . |
| 5,117,354 | 5/1992 | Long et al. . |
| 5,128,861 | 7/1992 | Kagami et al. . |
| 5,128,862 | 7/1992 | Mueller . |
| 5,132,899 | 7/1992 | Fox . |
| 5,172,314 | 12/1992 | Poland et al. . |
| 5,191,522 | 3/1993 | Bosco et al. . |
| 5,212,644 | 5/1993 | Frisch . |
| 5,249,120 | 9/1993 | Foley . |
| 5,270,922 | 12/1993 | Higgins . |

(List continued on next page.)

FOREIGN PATENT DOCUMENTS

| 11-7472 | * | 1/1999 | (JP) . |
| WO 98/02835 | * | 1/1998 | (WO) . |

OTHER PUBLICATIONS

Snow, B., "Trade Names in Medicine," Database, vol. 15, No. 3, pp. 99–105, Jun. 1992.*

Tweney, D., "Shopping Agents Help Consumers Find the Best Deals," vol. 19, No. 49, p. 98, Dec. 1997.*

LeSueur, S., "Telezoo Zips Through Purchasing Process," Washington Technology, vol. 14, No. 8, p. 36, Jul. 1999.*

The Ostomy Assessment Inventory: A Data Gathering Process to Enhance Appropriate Pouching System Selection—vol. 44 No. 2 Feb. 1998.

Ostomy Wound Management, The 1998 O/MM Buyers Guide—vol. 44 No. 7 Jul. 1998.

WWW.CADABRA.COM Nov. 23, 1999: Cadabra Comparison Shopping.Research, compare and buy your computer and electronic. (2 pages) Health and beauty Nov. 23, 1999 (3 pages).

(List continued on next page.)

*Primary Examiner*—Vincent Millin
*Assistant Examiner*—Nicholas David Rosen
(74) *Attorney, Agent, or Firm*—Dreier & Baritz LLP

(57) ABSTRACT

A method and apparatus for inputting an end-user's current brand name and, in return, providing at least one comparable branded product to the end-user where the category of branded products are non-comparison shopped products. In one embodiment, the method and apparatus is utilized in the area of medical devices including such markets as patients with intestinal stomas, incontinence wound care needs and diabetes.

25 Claims, 6 Drawing Sheets

U.S. PATENT DOCUMENTS

| | | | |
|---|---|---|---|
| 5,297,032 | | 3/1994 | Trojan et al. . |
| 5,313,560 | | 5/1994 | Maruoka et al. . |
| 5,331,544 | | 7/1994 | Lu et al. . |
| 5,339,392 | | 8/1994 | Risberg et al. . |
| 5,347,452 | | 9/1994 | Bay, Jr. . |
| 5,420,786 | | 5/1995 | Felthauser et al. . |
| 5,422,809 | | 6/1995 | Griffin et al. . |
| 5,758,095 | | 5/1998 | Albaum et al. . |
| 5,797,127 | | 8/1998 | Walker et al. . |
| 5,840,091 | * | 11/1998 | Strong ................................. 55/385.1 |
| 5,873,069 | | 2/1999 | Reuhl et al. . |
| 5,878,401 | | 3/1999 | Joseph . |
| 5,926,800 | | 7/1999 | Baronowski et al. . |
| 5,960,412 | | 9/1999 | Tackbary et al. . |
| 5,963,915 | | 10/1999 | Kirsch . |
| 5,963,924 | | 10/1999 | Williams et al. . |
| 5,970,463 | | 10/1999 | Allsop et al. . |
| 5,970,469 | | 10/1999 | Scroggie et al. . |
| 6,076,070 | * | 6/2000 | Stack ...................................... 705/20 |
| 6,128,600 | * | 10/2000 | Imamura et al. ...................... 705/27 |
| 6,173,210 | * | 1/2001 | Bjornson et al. ...................... 700/99 |

OTHER PUBLICATIONS

WWW.ACSES.COM Sep. 13, 1999: Aceses, the ultimate comparison shopping Engine. Compare prices from online shops. (3 pages).

WWW.COMPARISONSHOPPING.NET Sep. 14, 1999: Compare prices on Books, cameras, mortgages and more! (3 pages).

WWW.ABCGUIDES.COM Sep. 14, 1999: Credit card rates guide (5 pages).

WWW.TELEWORTH.COM Sep. 14, 1999 Money by utilizing Tele–Rate (1page), Entrepreneur magazine (1 page), In the news (1 page).

WWW.MORE.COM Sep. 13, 1999: Stockings (2 pages), Condoms (2 pages).

WWW.LIFESHOPPER.COM Sep. 13, 1999: Term life insurance through Intellequotes LifeShopper.

WWW.INTELEQUOTE.COM Sep. 13, 1999: Term life insurance information (2 pages), life insurance quotes–on line calculators–Lowest rate Highest coverage (3 pages).

* cited by examiner

FIG. 7

| MANUFACTURER | ITEM NAME | SIZE | STOCK# | COUNT | PRICE |
|---|---|---|---|---|---|
| | DURAHESIVE 4"X4" WAFER | 1 5/8" | | | |
| CONVATEC | WITH CONVEXLT | OPENING, | 1784-74 | 5PK | $53.27 |
| | | 2 1/4" FLANGE | | | |
| | CONTOUR 1 CLOSED POUCH | | | | |
| | WITH PRESIZED TAPERED | | | | |
| | SKIN BARRIER, OPAQUE, | | | | |
| | ODOR-BARRIER FILM, | | | | |
| | DEODORIZING FILTER AND | | | | |
| HOLLISTER | COMFORTWEAR PANEL | 1 9/16"(40MM) | 1714 | 30PK | 94.95 |
| CYMED | MICROHESIVE STOMA PASTE | | CK0138 | 1 TUBE | 9.85 |

| GENERIC DESCRIPTION | MANUFACTURER | ITEM NAME | SIZE | STOCK# | COUNT | PRICE |
|---|---|---|---|---|---|---|
| | COLOPLAST | ASSURA CONVEX SKIN BARRIER FLANGE W/ BELT LOOPS, PRE-CUT GUARDIAN F 2-PIECE WITH FIRSTCHOICE CONVEX SYNTHETIC | 1 5/8" (BLUE) | 12708 | 5PK | $42.00 |
| | | | | | | $39.48 |
| CONVEX FACEPLATES FOR 2-PIECE STOMA APPLIANCES | HOLLISTER | SKIN BARRIER | 1 5/8" OPENING(A) | 4439 | 5PK | $53.27 |
| → | CONVATEC | DURAHESIVE 4"X4" WAFER WITH CONVEXLT | 1 5/8" OPENING, 2 1/4" FLANGE | 1784-74 | 5PK | |
| | NU-HOPE | FLEXIBLE BARRIER, FECAL, | | 4040 | 5PK | $18.22 |
| | PLUS | 4"X4" ROUND BARRIER DISCS | 1 5/8" OPENING | 4083 | 5PK | $17.55 |
| | CONVATEC | SUR-FIT NATURA CLOSED-END POUCH WITH FILTER, OPAQUE CLOSED POUCH, WITH FILTER, SOFT BACKING, CUSTOM CUT | 1 1/2" | 401525 | 30PK | $59.62 |
| | COLOPLAST | WITH CURAGAURD, OPAQUE | 1/2"-2 1/4" | 5700 | 30PK | $96.71 |
| 1-PIECE, CLOSED END POUCH WITH DEODORIZING FILTER, OPAQUE → | HOLLISTER | CONTOUR 1 CLOSED POUCH WITH PRESIZED TAPERED SKIN BARRIER, OPAQUE, ODOR-BARRIER FILM, DEODORIZING FILTER AND COMFORTWEAR PANEL | 1 9/16"(40MM) | 1714 | 30PK | $94.95 |
| | SMITH & NEPHEW | BONGORT LIFESTYLE OSTOMY POUCH, NON-ABSORBANT COVER AND ADHESIVE WITH FILTER, OPAQUE | 1 1/2" | 183012 | 10PK | $35.16 |
| | DANSAC | CONTOUR CLOSED POUCH, OPAQUE | 1 1/2" | 225-25 | 30PK | $97.74 |
| | COLOPLAST | SKIN BARRIER PASTE | | 2650 | 1 TUBE | $9.65 |
| | CONVATEC | DUODERM HYDROACTIVE PASTE | | 187930 | 1 TUBE | $11.45 |
| | CONVATEC | STOMAHESIVE PASTE | | 189310 | 1 TUBE | $10.40 |
| STOMA PASTE → | CYMED | MICROHESIVE STOMA PASTE | | CK0138 | 1 TUBE | $9.85 |
| | DANSAC | SOFT PASTE | | 77550 | 1 TUBE | $10.30 |
| | HOLLISTER | HOLLIHESIVE PASTE | | 7920 | 1 TUBE | $5.35 |
| | HOLLISTER | KARAYA PASTE | | 7919 | 1 TUBE | $6.25 |
| | HOLLISTER | PREMIUM PASTE | | 7930 | 1 TUBE | $11.10 |

SYSTEM AND METHOD FOR PROVIDING A COMPARABLE BRANDED PRODUCT BASED ON A CURRENT BRANDED PRODUCT FOR NON-COMPARISON SHOPPED PRODUCTS

FIELD OF THE INVENTION

The present invention relates to a system for providing a comparison of comparable branded products. More particularly, the invention relates to a method and apparatus for providing at least one comparable branded product to an end-user, wherein the category of products are non-comparison shopped products.

BACKGROUND OF THE INVENTION

There are numerous categories of products that are sold by brand name. Typically, for certain categories of products, each manufacturer markets its branded products as separate from other manufacturers. Moreover, for these same type of products, a distributor that offers for sale the same or similar product category by different manufacturers will typically have its catalogue organized by manufacturer and not by product category. In this way, a consumer is unable to compare different brand names from different manufacturers in order to purchase alternative products. Examples of such markets include patients with intestinal stomas, incontinence, wound care needs, diabetes; and for patients requiring home respiratory therapy, respiratory access and tracheotomy care, home intravenous therapy, home occupational, physical and/or rehabilitation therapy, pediatric products, chiropractic and/or orthopedic equipment, braces and supports. Other examples of such markets include the category of perfumes.

In one embodiment, the present invention is applied to products used in conjunction with a stoma (e.g. an opening through the body wall). In urostomy, colostomy, ileostomy, and other similar operations, part or all of a patient's bladder, intestine, or other organ is removed, and is replaced with a conduit for channeling body fluids or waste out of the patient's body via a stoma or tube. In the case of a colostomy, ileostomy or urostomy, body waste is collected by an external apparatus, usually attached to the patient's skin around the stoma or tube. For example, a conventional ostomy appliance is a relatively flat plastic bag having an aperture to receive the stoma, the bag usually being formed with a flange for fitting around the stoma and for being sealed to the skin of the abdomen with an adhesive layer.

A primary problem faced by ostomates is that of undesired leakage around the containment appliance attached to the stoma location. Typically, a pouch for containing and holding the bodily drainages (i.e., human excrement, such as fecal matter or urine) is adhesively attached to the skin surrounding the stoma. Any type of relative movement between the surrounding skin area and the adhesive material will create a channel or a track through which bodily drainages will leak. Such leakages may cause detrimental damage to the surrounding skin and are also a source of humiliation and embarrassment for the ostomate, not to mention the other problems associated with smell and damage to clothing.

Because of these conditions, there exist numerous products that are used with or in conjunction with a stoma including pouches, ostomy systems, sealants and skin barriers. For example, Hollister offers for sale a line of branded drainable pouches named "First Choice" while Coloplast offers for sale its own line of branded drainable pouches named "Assura". However, prior to the present invention, an end-user of one of these branded products would not and could not directly compare these branded products. Accordingly, as an example, an end-user who was presently buying a specific type of "Assura" drainable pouch would not be able to comparison shop and thus, compare to a specific type of a "First Choice" product. Moreover, in many cases, end-users were unaware that comparable branded products even existed and thus, the end-user may have had no expectation that he/she could comparison shop.

In addition, manufacturers of a specific branded product have been motivated in the past to assure that its branded product can not be comparison shopped with another manufacturer's branded product. Manufacturers employ numerous methods to achieve this result including, for example: (a) establishing a branded name (i.e. a label for the specific product); (b) establishing an internal proprietary coding system; (c) publishing catalogues and other sales information that avoids any detailed analysis of the product; and (d) providing insufficient details of their product so that distributors are required to publish catalogues that are compiled according to each manufacturer and not according to product category. All of these techniques have one main purpose—to prevent the manufacturer's own branded product from being compared to other potentially competitive products. In this way, an end-user who has previously bought certain branded product from one manufacturer, will not be likely to switch to another manufacturer's branded product. Thus, the end-user will continue to purchase from the same manufacturer.

In contrast, there exist product categories that have a history of comparison shopping. For example, one category that has produced a multitude of products and has become a highly competitive comparison shopping environment is consumer appliances and electronics. Each type of product such as a television set is typically available from several different manufacturers, and each manufacturer typically produces several models of the same type of product. For example, an electronic distributor will typically display 20 inch television sets from different manufacturers and several models from the same manufacturer in a side-by-side comparison. As such, for these product categories, there exists an expectation on behalf of the end-user that there are comparable branded products.

Despite these known categories of products involving comparison shopping, there still is needed a system that automatically compares branded products (that were previously only identified according to their own brand manufacturer and not comparison shopped) for the categories of non-comparison shopped products and provides an accurate and precise comparison, responsive to changing industry products, that also provides point of sale assistance to consumers with branded products and price comparisons among manufacturers products.

SUMMARY OF THE INVENTION

For purpose of the present invention, the term "comparable" product means a product, or combination of products, that is interchangeable with the original branded product and that does not result in any additional detrimental effects when compared to the original product. The term "branded" name or "branded" product means the manufacturers specific identification of its own product. For example, a "branded" product may include a trademark, a manufacturer's proprietary identification or other means used by a manufacture to identify its product and thus, to make the product distinct from other products.

Moreover, for purposes of this present invention, the term "non-comparison shopped product" means a type of product that, without technical assistance, an end-user of the product is not capable of determining at least one comparable product. The term "end-user" means the person who is using the product. For example, for a pouch to be used with an intestinal stoma, the end-user is the patient. The term "technical assistance" means a person having information concerning the specific branded product that is known only to those of ordinary skill in the art of the particular product category. The following are examples of "non-comparison shopped products"(but, are not limited to the following examples): (a) for patients with intestinal stomas, pouches, ostomy systems, sealants, and skin barriers; (b) for patients with incontinence, urinary catheters; (c) for patients with wound care needs (e.g. care of chronic wounds such as venous stasis ulcers and decubitus ulcer), skin barrier dressings and hydrogel dressings; and (d) for patients requiring respitory access and tracheostomy care, tracheostomy tubes. In a specific example, numerous non-comparison shopped products are offered for sale in the catalogue, "The Complete Home Care and Ostomy Suppliers Catalog," distributed by Edgepark Surgical Inc. In that catalogue, ostomy products are generally categorized according to manufacturer (e.g. ConvaTec, Hollister, Smith & Nephew, Inc., Coloplast, Nu-Hope, Cymed/Bard) and not according to product category (eg. pouches, ostomy systems, sealants, skin barriers).

The present invention provides an automated system and apparatus that provides an end-user with the capability to compare and display comparable branded products for a plurality of products and also provides an end-user at the point of sale with comparisons of comparable branded products among the same manufacturer and other manufacturers. Specifically, the present invention relates to an automated system for providing at least one comparable branded product to an end-user, wherein the end-user's current branded product is a non-comparison shopped product, wherein the method comprises:

(a) entering means for entering the product data of the product including branded name and for generating an output corresponding to the product data;

(b) generating means for receiving said output from said entering means, for accessing a set of data relating to other branded products, and for generating a function based on said output and said set of data, wherein said function has a branded product comparator;

(c) computing means for receiving said function from said generating means and for computing a comparable branded product based upon said received function; and (d) transferring means for providing at least one comparable branded product to said user.

In one embodiment, the hardware for the system comprises a storage device for storing survey, branded products and transaction information in a data structure format, a memory medium, a central processing unit and a communication port. In one embodiment, the database is a relational database. The tables of the database may be in the format of rows and columns.

The system also contains a stored program-controlled application for comparing branded products and/or accompanying survey responsive to market fluctuations and changes. Thus, in one embodiment, as the data records in the tables are updated, a software program is utilized that automatically reconfigures the comparative branded products in accordance with an established comparator.

Accordingly, in another embodiment, the system of the present invention is a computerized comparator of branded products. Specifically, in yet another embodiment, the branded product comparator function of the system is responsive to branded products of the same and different manufacturers. The database of the system may include one or more identification markers for each item offered, including a product identification number, e.g. a stock keeping unit ("SKU"), and the manufacturer. The comparator software may define, among other elements, the type, category, measurements (including diameter(s) of device, size) and material composition.

In overall operation in one embodiment, the system receives a specific branded product from a specific manufacturer, compares this specific branded product with the database's comparable branded products, and automatically selects one or more comparable branded products or combination of comparable products. Manufacturer's branded products are input on a regular basis (e.g. daily, hourly, or other frequencies are possible) as necessary.

As a database system, the product invention may generate a variety of forms and reports. As an output device, the comparable branded product or products may be displayed in any method suitable to the end-user.

BRIEF DESCRIPTION OF THE DRAWINGS:

The accompanying drawings are included to provide a further understanding of the present invention. These drawings are incorporated in and constitute a part of this specification, illustrate one or more embodiments of the present invention, and together with the description, serve to explain the principles of the present invention.

FIG. 7 illustrates an example of the brand name comparator of one embodiment of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 1:
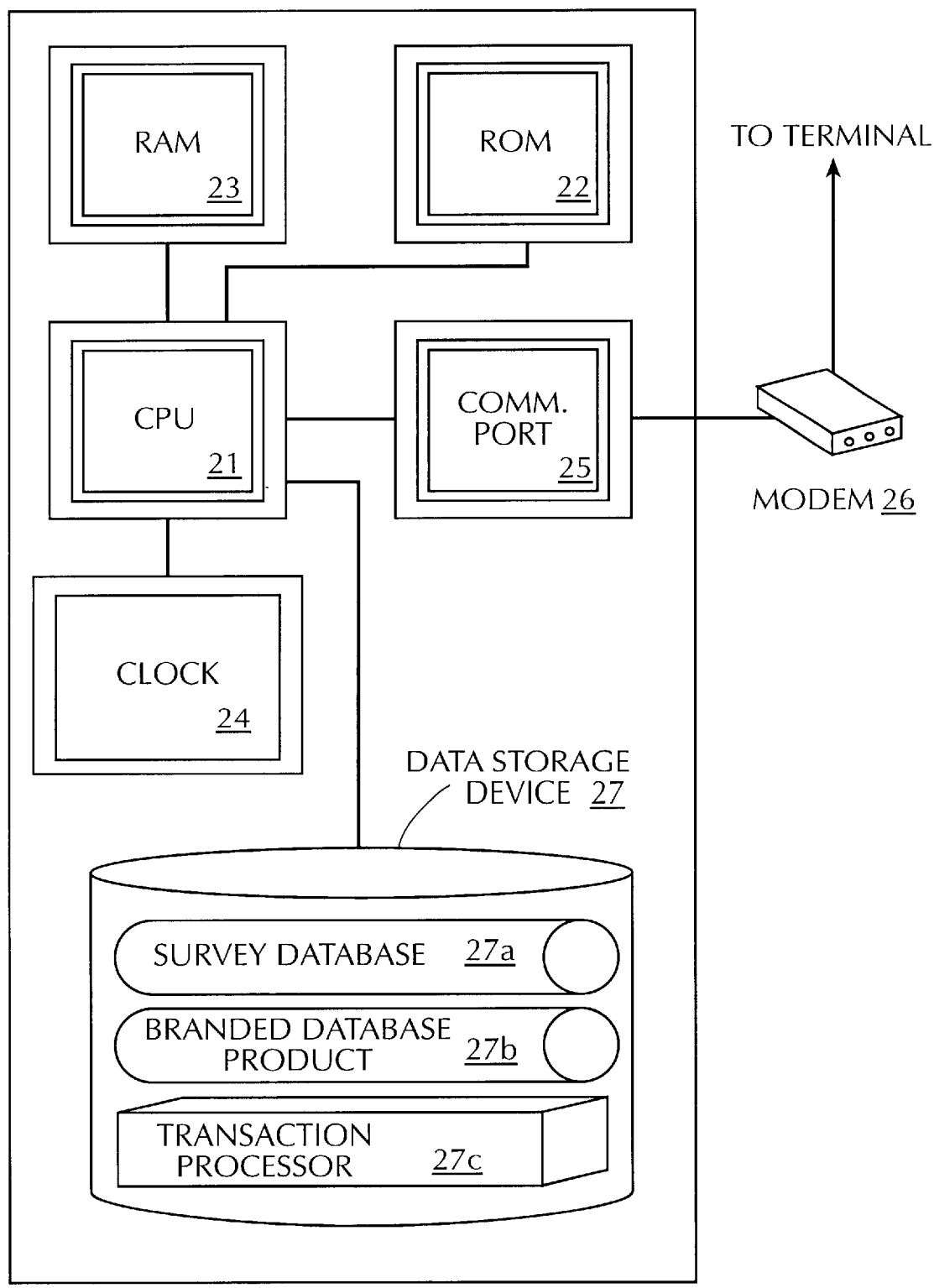
FIG. 1 illustrates a block diagram of the central controller in accordance with one embodiment of the present invention.

FIG. 1 illustrates one embodiment of the central controller 20 of the present invention. The central controller includes a CPU 21 which performs the processing functions of the controller. It also includes a read only memory 22 (ROM) and a random access memory 23 (RAM). The ROM 22 is used to store at least some of the program instructions that are to be executed by the CPU 21, such as portions of the operating system and the RAM 23 is used for temporary storage of data. A clock circuit 24 provides a clock signal which is required by the CPU. The use of a CPU in conjunction with ROM, RAM and a clock circuit is well known in the art of CPU based electronic circuit design.

The central controller 20 also includes a communication port 25 which enables the CPU 21 to communicate with devices external to the central controller. In one embodiment, a modem 26 is used to communicate with devices outside the central controller 20. However, other methods of communication with external devices may be used including hard-wired connections, wire-less connections and optical communications.

The CPU 21 can also store information to, and read information from, the data storage device 27. This data storage device includes, in one embodiment, a survey database 27a and a branded product database 27b. The data storage device 27 may also include a transaction processor instructions 27c which can be read by and executed by the CPU 21 and thus, enables the CPU 21 to process transactions. In another embodiment, the survey database and branded product database may be incorporated into a single database.

Figure 2:
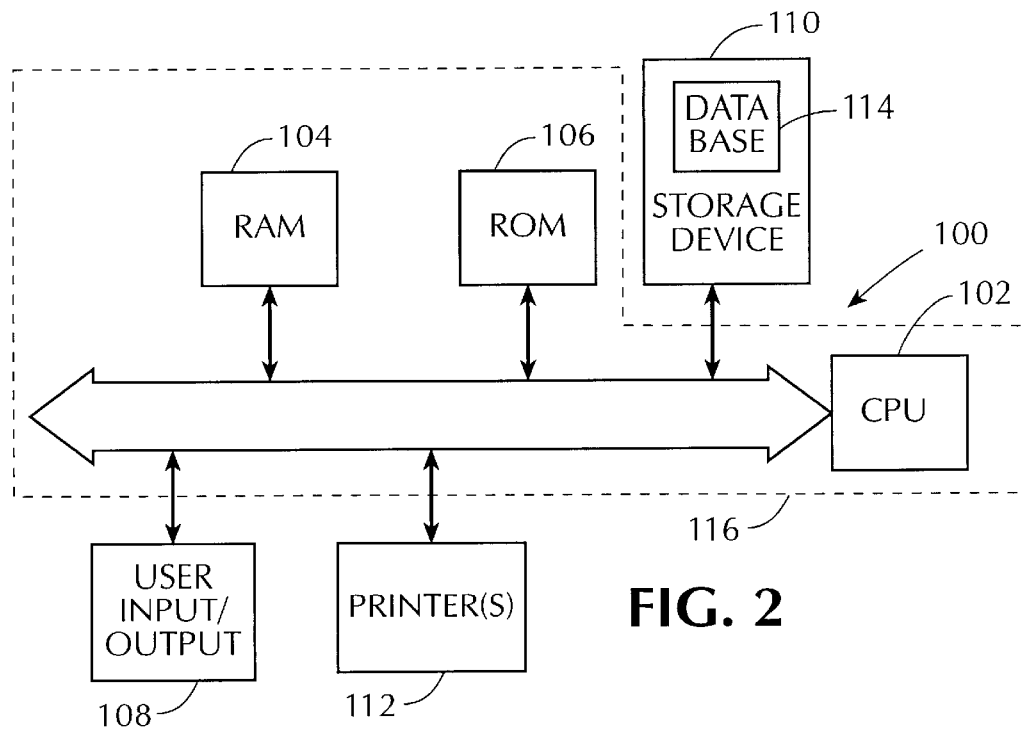
FIG. 2 is a schematic diagram of hardware in accordance with one embodiment of the present invention.

FIG. 2 illustrates one embodiment of the present invention depicting the hardware component. The hardware 100 includes a CPU 102, a RAM 104, a ROM 116, storage device 110 such as a hard disk including a database 114 stored therein and user input/output devices 108 such as terminals. A computer 116 includes RAM 104, ROM 116 and CPU 102. Optionally, a printer 112 is attached to the computer.

Figure 3:
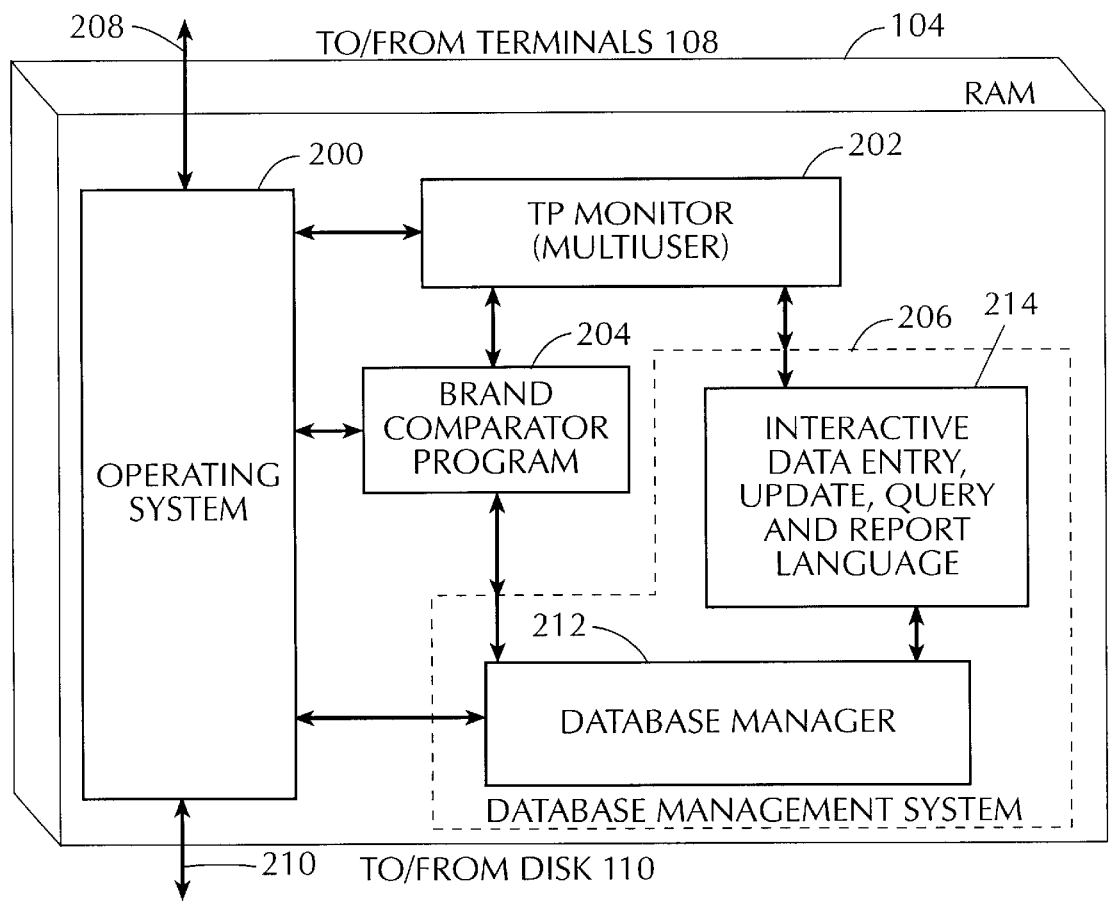
FIG. 3 is a schematic diagram representing the operation of the RAM in accordance with one embodiment of the present invention.

FIG. 3 shows schematically the organization of RAM 104 which includes an operating system 200, a teleprocessing (TP) multi-user monitor 202, a brand comparator program 204, a database management system 206 that manages the transfer of data between multiple local and remote terminals. Reference 208 and 210 refer to communicating access connections to terminals 108 and storage devices 110, e.g. hard disks. Database management system 206 includes a database manager 212 and an interactive query/update language component 214 wherein a user can query and update data records in the database 114.

In yet another embodiment, as is known in the art, a relational database is employed. A relational database is a database in which sets of related data are treated logically as if they were contained in two-dimensional tables in which each data record of the set appears as a row and attributes or fields of the items are arranged as columns. Since the database is relational, each of its tables will have a column that is the same as a column of at least one other table. Each specific model of a branded product in the system user's inventory, regardless of database organization, is characterized in the database, by certain parameters (attributes or fields). Each specific model of the branded product may be assigned a unique product identification number which is used to identify it from other items in the database. Each product may also have one or more parameters which are used, for example, to group the product into one or more product groups or describe features of the product. In one embodiment of the present invention, the parameters for each product in the system user's inventory suitably includes, without limitation, a unique SKU, a product description, a manufacturer's name and number, and a branded name.

Figure 4:
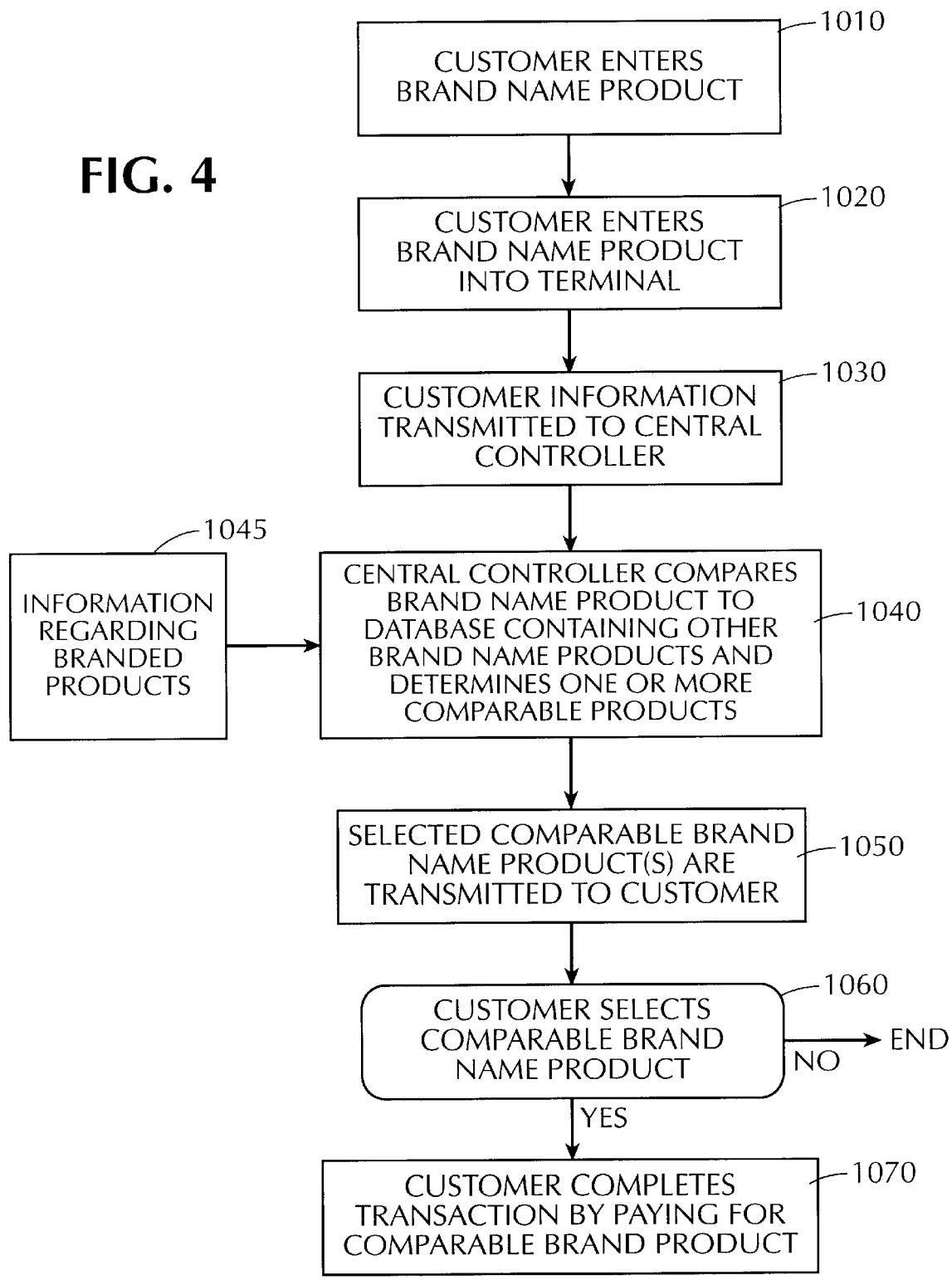
FIGS. 4 and 5 illustrate flow diagrams of various embodiments of methods of the present invention.

FIG. 4 illustrates a flow diagram representing one embodiment where a customer (i.e. end-user) is presently purchasing a specific branded product and, the present invention provides the end-user with one or more comparable branded products. Customer enters brand name product (e.g. the product customer is presently purchasing) (step 1010). Customer enters brand name product into terminal (step 1020). The customer information is transmitted to the central controller (step 1030). Information concerning each branded product is inputted into the central controller on a periodic basis (e.g. hourly, daily, weekly or monthly) and updated as necessary (step 1045). In one embodiment, each input branded product is analyzed by computer means and/or by an individual who is specifically trained to analyze and describe the branded products in specific product categories. For example, in one embodiment, in the area of stoma products, an individual, who is trained in this area (e.g. an enterostomal therapist), inspects the branded product and inputs the product characteristics and specifications of the branded product. In another embodiment, a computer program is written to "search" the internet for branded products in a specific category and for any characteristics of the branded products. The central controller then compares the current end-user's brand name product to the database containing other brand name products (including specific product characteristics) and determines one or more comparable products (step 1040). At least one selected comparable brand name product is transmitted to the customer (step 1050). In addition, the customer can then select the comparable brand name product (step 1060). Finally, the customer completes the transaction by paying for comparable brand product (step 1070).

In another embodiment, a problem based survey may be used in conjunction with the analysis of the end-user's current branded product. For example, in one embodiment of stoma products, the following survey may be employed:

What type of operation: Ileostomy, Colostomy or Urostomy?
    Narrows down to the correct type of appliances
Is the stoma flat or retracted?
    Leads to convex faceplates
Is there a hernia, or bulge by the stoma?
    Leads to binder, such as Nu-Hope Cool Comfort Support Belt
Is the stoma too high, or on top of a large bulge on the belly?
    Adjust wafer size down
Is the stoma too low, or under a bulge on the belly?
    Adjust wafer size up
Is there any skin surface irregularity around the stoma (e.g. bony prominence, scar or belly button)
    Special contour appliances like Hollister Contour I or sealants like Eakin Cohesive Seals under any stoma appliance
Do you have difficulty concealing the appliance under your clothes?
    Low-profile appliances
Does the stoma prolapse or protrude excessively?
    No low-profile appliances
Are you prone to skin rash?

Powders, creams, moisture barriers
Some prescription items here (e.g. Lotrimin cream for candida rash)

Figure 5:
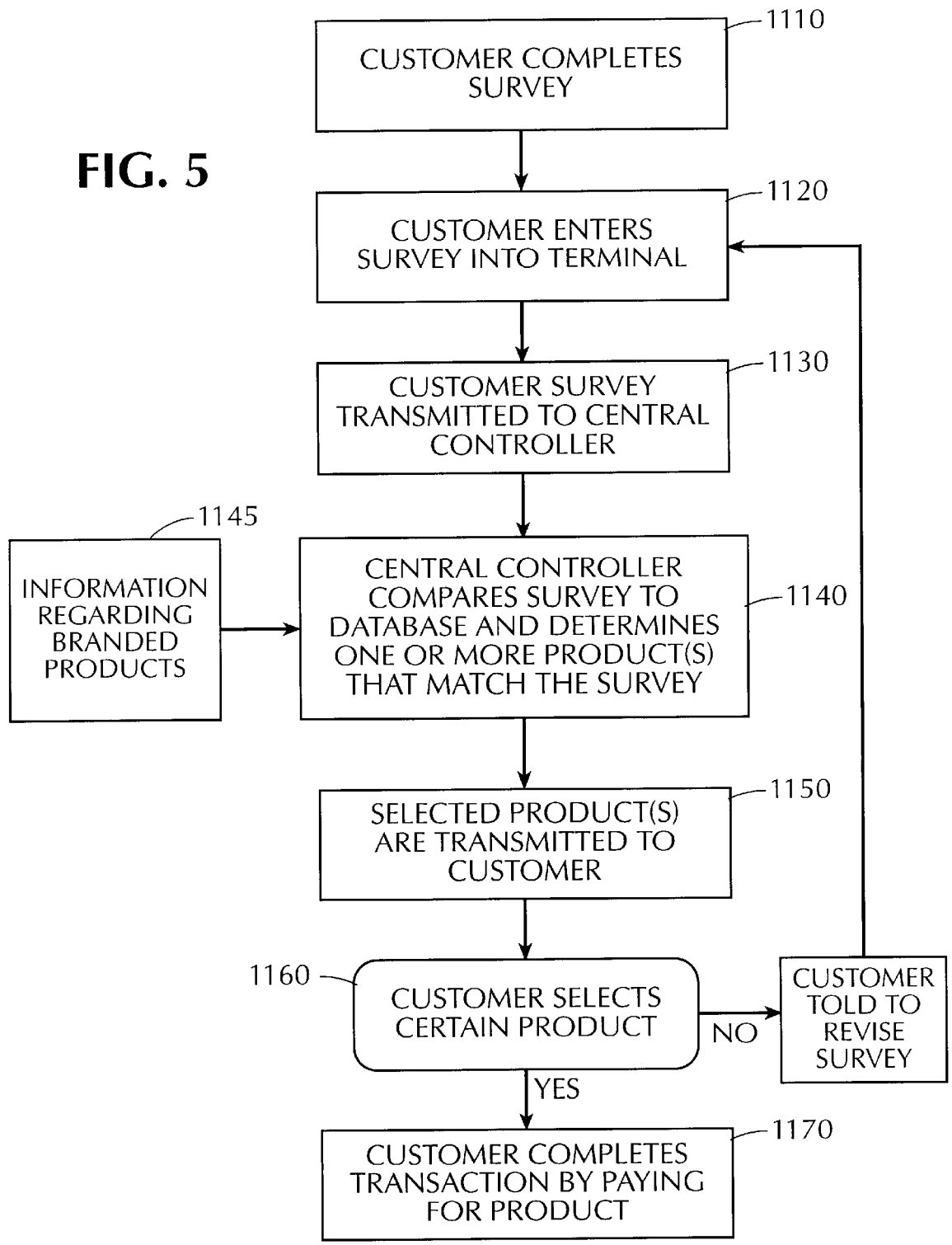

FIG. 5 illustrates a flow diagram representing another embodiment where a survey is used in conjunction with a branded product analysis. In this embodiment, the customer (i.e. end-user) completes the survey (step 1110). Customer enters the survey into terminal (step 1120). The customer information is transmitted to the central controller (step 1130). Information concerning each branded product and responses to survey data corresponding to branded products is inputted into the central controller on a periodic basis and updated as necessary including branded products that meet the criteria of various questions of the survey (step 1145). The central controller then compares the survey data to the database and determines one or more product(s) that meet the acceptable criteria of the survey (step 1140). One or more selected comparable branded product(s) are transmitted to the customer (step 1150). In addition, the customer can then select one or more of the comparable brand name products (step 1160). And, the customer completes the transaction by paying for comparable brand product (step 1170).

In another embodiment, FIG. 4 and FIG. 5 may be combined so that the customer enters both the problem based survey data and the end-user's current branded product that he/she is currently using.

Figure 6:
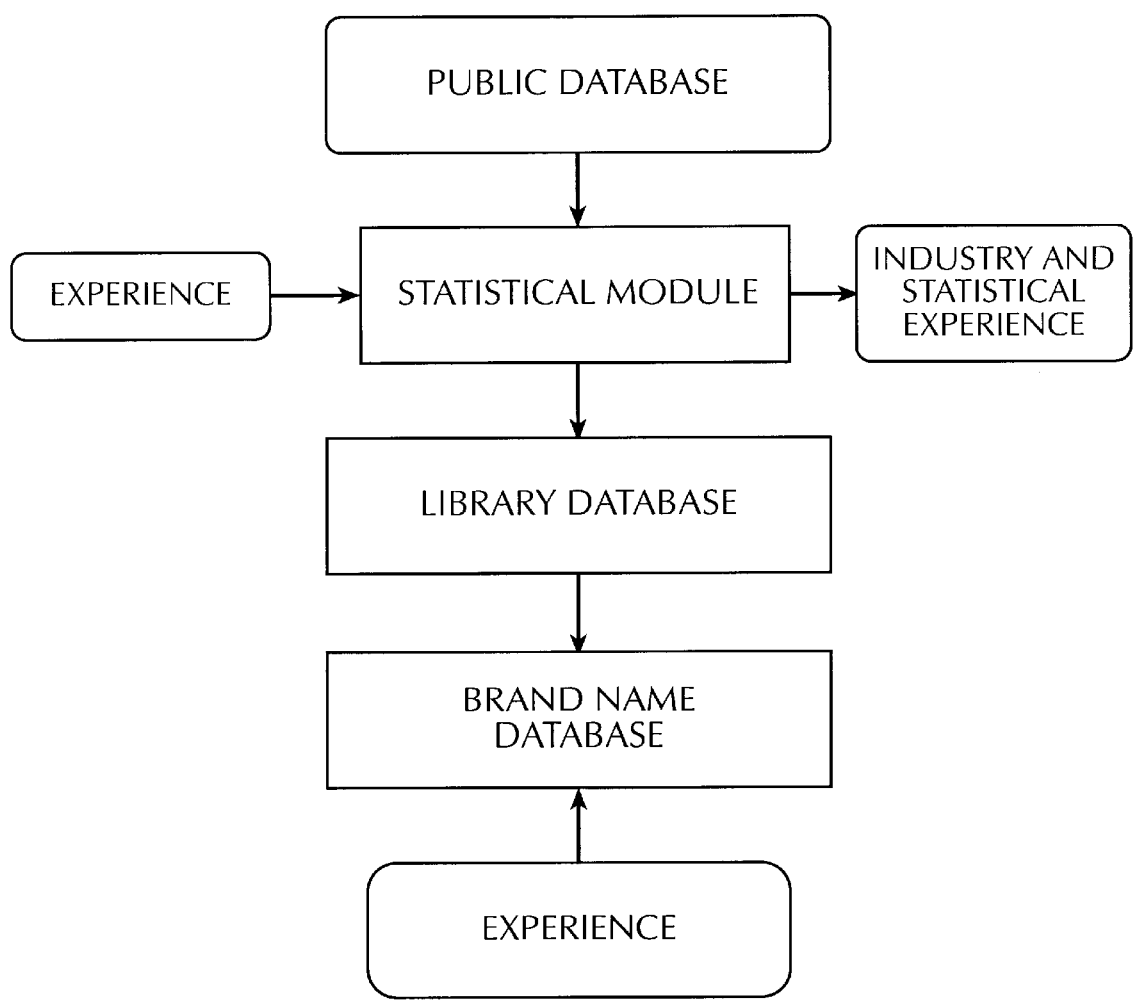
FIG. 6 illustrates a block diagram of the brand name database of one embodiment of the present invention.

FIG. 6 is one embodiment of the brand name database. The database system generally comprises a statistical module that uses: (a) industry and statistical experience of a specific branded product; (b) public database that relates to the specific product (e.g. manufacturers catalogues, internet sites); and (c) experience obtained by inspecting specific branded product. The statistical module creates a library database of branded products. The brand name database combines specific information relating to the end-user with the library database to generate one or more comparable branded products.

FIG. 7 is an example of one embodiment of the present invention in the area of stoma devices. The left-most column labeled "manufacturer" is the input information of the manufacturer by the end-user (if known). The next column is input information by the end-user of his/her current branded product. The next column is the size of the end-user's branded product. This information may be entered by the end-user. In one embodiment, the end-user also inputs the SKU and count. In another embodiment, the central controller generates the SKU and count along with the price. The central controller then compares the inputted information to the database and computes a "generic" description. The two right side columns are the comparable branded product information transmitted to the end-user. As shown in FIG. 7 in one example, the present invention generates a comparable branded product that is sold by a manufacturer as two separate items (see e.g. "Nu-Hope Flexible Barrier, Fecal, 4"x4"" and "Nu-Hope Round Barrier Discs").

In another embodiment, in addition to transmitting at least one comparable branded name product to the end-user, the present invention automatically implements price responses based on the computation of comparable branded products. For example, in yet another embodiment, as illustrated in FIG. 7, comparable branded products are computed with their corresponding initial prices. After computing these comparable branded products, the system may implement an additional program that compares the price of the end-user's current branded product with the comparable branded products. The system then adjusts the prices, either increasing or decreasing the prices of the comparable branded products based on a set margin established by the distributor of the system.

In yet another embodiment of the price response program, the controller may have an additional program that automatically implements price responses based on a comparison of advertised prices of other competitors (e.g. distributors). The displayed price may then be adjusted to reflect a lower price than the competitors' prices. The program may also contain a "minimum" price for a particular product so that the displayed price is not less than this "minimum" price.

In a further embodiment, the present invention may be used for providing at least one comparable branded women's or men's perfume to an end-user. For example, a woman would input her current brand name. The brand name database perfume product would contain detailed information concerning the precise chemical make-up of that and other brand name women's perfumes. In one embodiment, to produce the brand name product database, a sample of each specific branded perfume would be analyzed by gas chromatographes, infrared spectrometer, thermal chromatograph and/or mass spectrometer, or any combination of these devices. An electronic "fingerprint" (eg. identification) would be produced for each sample. In another example, a device called a "Cyrano 2000" instrument may also be used to identify the electronic "fingerprint" of each sample. See e.g., "A Nose For Business," MIT's Technology Review (July/August 1999), pp. 62–7. The central controller would compare the current brand name product to the database and determine one or more women's brand name(s) that correspond(s) to the electronic "fingerprint" of the current brand name. The central controller would be programmed to allow for established deviations when comparing the "fingerprint" of the current brand name to "fingerprints" in the database. One or more comparable brand name perfumes would be transmitted to the end-user. In yet another embodiment, the central controller would select two or more specific branded name perfumes to be combined by the end-user in order to produce a comparable smell of the current brand name perfume.

In combination with the above embodiments concerning the perfume applications, a survey may be implemented. The survey may include such items as the "likes and dislikes" of various odors such as various food and flower odors. In this way, the present invention would select the desired brand name perfumes that correlate to the "fingerprint" and the survey.

A system and method for providing a comparable branded product based on a current branded product for non-comparison shopped products have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without department from the teachings, spirit and intended scope of the invention.

What is claimed is:

1. A computer implemented method of identifying at least one comparable branded non-standardized medical device product to an end-user's selected branded non-standardized medical device product, wherein the method comprises:

(a) entering product data relating to the end-user's selected branded non-standardized medical device product into an entering device, wherein the product data includes a branded name of the end-user's selected branded non-standardized medical device product and wherein the entering step comprises generating an output corresponding to the product data;

(b) querying a database using a query based upon the output corresponding to the product data, wherein the database contains a set of data relating to branded non-standardized medical device products and wherein the set of data includes, for each branded non-standardized medical device product contained in the database, information regarding a desired functional result (c) receiving a query result containing at least one comparable branded non-standardized medical device product, wherein the query result is based upon an existence of a substantial equivalence between the desired functional result of the end-user's selected branded non-standardized medical device product and the desired functional result of at least one comparable branded non-standardized medical device product contained in the query result; and (d) identifying the at least one comparable branded non-standardized medical. device product contained in the query result to the end-user.

2. The method of claim 1, wherein the computed comparable branded product is composed of a combination of at least two different branded products.

3. The method of claim 1, wherein the non-standardized medical device products are a category of products for patients with intestinal stomas.

4. The method of claim 3, wherein the category of products is a group consisting of pouches, ostomy systems, and sealants.

5. The method of claim 1, wherein the non-standardized medical device products are a category of products for patients with incontinence.

6. The method of claim 5, wherein the products are urinary catheters.

7. The method of claim 1, wherein the non-standardized medical device products are a category of products for patients with wound care needs.

8. The method of claim 7, wherein the products are skin barrier dressings and hydrogel dressings.

9. The method of claim 1, wherein the non-standardized medical device products are a category of products for patients requiring respiratory access and tracheostomy care.

10. The method of claim 9, wherein the products are tracheostomy tubes.

11. The method of claim 1, further comprising:
a payment receiving component configured to receive payment for the comparable branded non-standardized medical device product.

12. The method of claim 1 further comprising the step of entering survey data in conjunction with the step of entering product data relating to the end-user's selected branded non-standardized medical device product.

13. An automated system for identifying at least one comparable branded non-standardized medical device product to an end-user's, selected branded non-standardized medical device product, wherein the system comprises:

(a) entering means for entering the product data relating to the end-user's selected branded non-standardized medical device product, wherein the product data includes a branded name of the end-user's selected branded non-standardized medical device product and for generating an output corresponding to the product data;

(b) generating means for receiving said output from said entering means, for querying a database using a query based upon the output corresponding to the product data, wherein the database contains a set of data relating to branded non-standardized medical device products, and for generating a function based on said output and said set of data, wherein the set of data includes, for each branded non-standardized medical device product contained in the database, information regarding a desired functional result;

(c) receiving means for receiving a query result containing at least one comparable branded non-standardized medical device product, wherein the query result is based upon an existence of a substantial equivalence between the desired functional result of the end-user's selected branded non-standardized medical device product and the desired functional result of at least one comparable branded non-standardized medical device product contained in the query result from said generating means; and (d) transferring means for providing at least one comparable branded non-standardized medical device product to said user.

14. The system of claim 13, wherein the computed comparable branded product is composed of a combination of at least two different branded products.

15. The system of claim 13, wherein the non-standardized medical device products are a category of products for patients with intestinal stomas.

16. The system of claim 15, wherein the category of products is a group consisting of pouches, ostomy systems sealants and skin barriers.

17. The system of claim 13, wherein the non-standardized medical device products are a category of products for patients with incontinence.

18. The system of claim 17, wherein the products are urinary catheters.

19. The system of claim 13, wherein the non-standardized medical device products are a category of products for patients with wound care needs.

20. The system of claim 19, wherein the products are hydrogel dressings.

21. The system of claim 13, wherein the non-standardized medical device products are a category of products for patients requiring respiratory access and tracheostomy care.

22. The system of claim 21, wherein the products are tracheostomy tubes.

23. A computer implemented method of identifying at least one comparable branded non-standardized medical device product to an end-user using a selected branded non-standardized medical device product, wherein the method comprises:

(a) entering product data relating to the end-user's selected branded non-standardized medical device product into an entering device, wherein the product data includes a branded name of the end-user's selected branded non-standardized medical device product and wherein the entering step comprises generating an output corresponding to the product data;

(b) querying a database using a query based upon the output corresponding to the product data, wherein the database contains a set of data relating to branded non-standardized medical device products and wherein the set of data includes, for each branded non-standardized medical device product contained in the database, information regarding a desired functional result;

(c) receiving a query result containing at least one comparable branded non-standardized medical device product, wherein the query result is based upon an existence of a substantial equivalence between the desired functional result of the end-user's selected branded non-standardized medical device product and the desired functional result of at least one comparable branded non-standardized medical device product contained in the query result;

(d) computing the price of the comparable branded non-standardized medical device product by comparing a set price of the comparable product with a competitor's price for the comparable branded product and re-pricing the comparable branded product; and (e) identifying the, at least one comparable branded non-standardized medical device product contained in the query result and price to the end-user.

24. The method of claim 23, wherein the re-priced comparable product is set at a price below the competitor's price.

25. A method of identifying at least one comparable branded non-standardized medical device product to an end-user's selected branded non-standardized medical device product, wherein the method comprises:

(a) entering product data relating to the end-user's selected branded non-standardized medical device product into an entering device, wherein the product data includes a branded name of the end-user's selected branded non-standardized medical device product and wherein the entering step comprises generating an output corresponding to the product data;

(b) querying a database using a query based upon the output corresponding to the product data, wherein the database contains a set of data relating to branded non-standardized medical device products and wherein the set of data includes, for each branded non-standardized medical device product contained in the database, information regarding a desired functional result;

(c) receiving a query result containing at least one comparable branded non-standardized medical device product, wherein the query result is based upon an existence of a substantial equivalence between the desired functional result of the end-user's selected branded non-standardized medical device product and the desired functional result of at least one comparable branded non-standardized medical device product contained in the query result; and (d) identifying the at least one comparable branded non-standardized medical device product contained in the query result to the end-user.

* * * * *